United States Patent
Chan et al.

(10) Patent No.: US 7,460,782 B2
(45) Date of Patent: Dec. 2, 2008

(54) PICTURE COMPOSITION GUIDE

(75) Inventors: Woei Chan, Darlinghurst (AU); Andrew James Dorrell, East Blaxland (AU)

(73) Assignee: Canon Kabushiki Kaisha, Tokyo (JP)

( * ) Notice: Subject to any disclaimer, the term of this patent is extended or adjusted under 35 U.S.C. 154(b) by 604 days.

(21) Appl. No.: 11/146,165

(22) Filed: Jun. 7, 2005

(65) Prior Publication Data

US 2005/0276596 A1 Dec. 15, 2005

(30) Foreign Application Priority Data

Jun. 8, 2004 (AU) .............................. 2004903126

(51) Int. Cl.
G03B 13/00 (2006.01)
(52) U.S. Cl. ...................... 396/281; 396/374; 382/294; 348/333.03
(58) Field of Classification Search ................ 396/374, 396/296, 281; 348/333.01–333.13; 382/294
See application file for complete search history.

(56) References Cited

U.S. PATENT DOCUMENTS

| | | | |
|---|---|---|---|
| 4,011,571 A | 3/1977 | Okuzawa .................... 354/219 |
| 4,764,785 A | 8/1988 | Burnham .................... 354/219 |
| 5,229,801 A | 7/1993 | VanDeMoere .............. 354/222 |
| 5,245,381 A * | 9/1993 | Takagi et al. ................ 396/287 |
| 5,557,358 A * | 9/1996 | Mukai et al. ................ 396/296 |
| 5,640,627 A * | 6/1997 | Nakano et al. .............. 396/296 |
| 5,687,408 A * | 11/1997 | Park .......................... 396/271 |
| 5,831,670 A | 11/1998 | Suzuki ....................... 348/207 |
| 5,835,616 A * | 11/1998 | Lobo et al. .................. 382/118 |
| 5,873,007 A | 2/1999 | Ferrada Suarez ............ 396/296 |
| 6,134,392 A * | 10/2000 | Gove .......................... 396/296 |
| 6,606,117 B1 | 8/2003 | Windle ....................... 348/239 |
| 6,915,072 B2 * | 7/2005 | Takahashi et al. ........... 396/296 |
| 7,120,461 B2 * | 10/2006 | Cho ......................... 455/556.1 |
| 2003/0169350 A1 | 9/2003 | Wiezel et al. ............... 348/239 |

FOREIGN PATENT DOCUMENTS

EP 1 128 316 A1 8/2001

* cited by examiner

*Primary Examiner*—Christopher E Mahoney
*Assistant Examiner*—Fang-Chi Chang
(74) *Attorney, Agent, or Firm*—Fitzpatrick, Cella, Harper & Scinto

(57) ABSTRACT

A method (500) of providing a picture composition guide on a display device (407) of a camera (450) is disclosed. The method (500) operates by firstly detecting (502) settings of the camera (450). Image analysis (503) is then performed on an image being displayed on the display device (407), the image representing a photographic scene. Next, the presence and location of strong features are determined based on the result of the image analysis (503). One or more markers are selected (505) dependent upon the camera settings and the strong features. The one or more markers are then superimposed over the image on the display device (407).

4 Claims, 14 Drawing Sheets

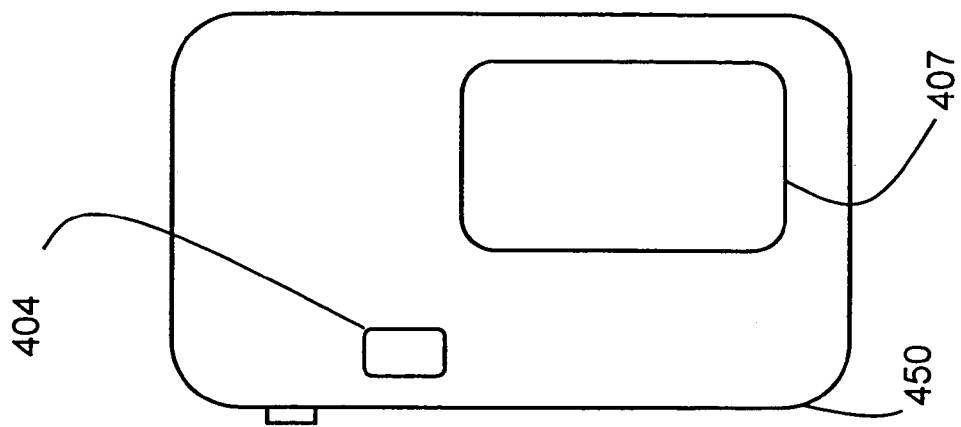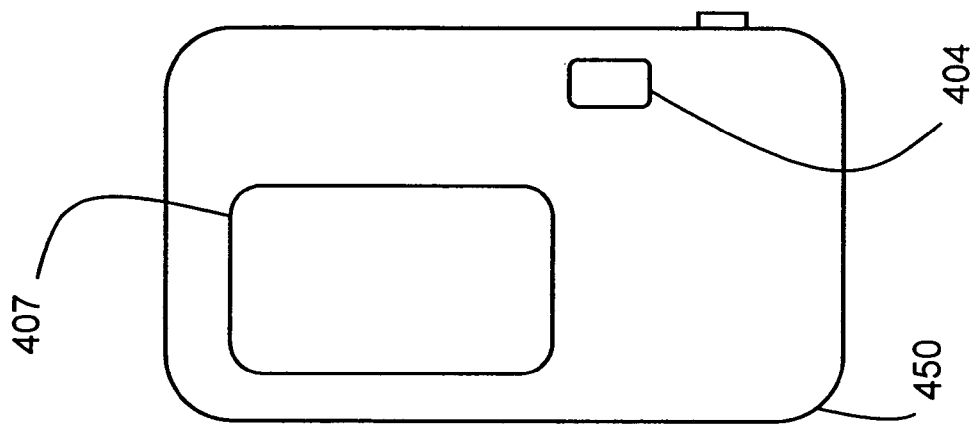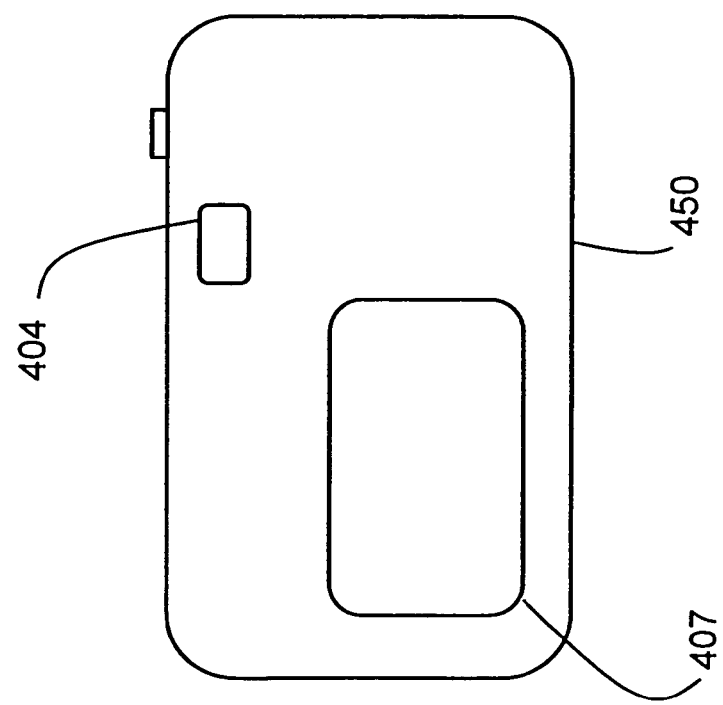

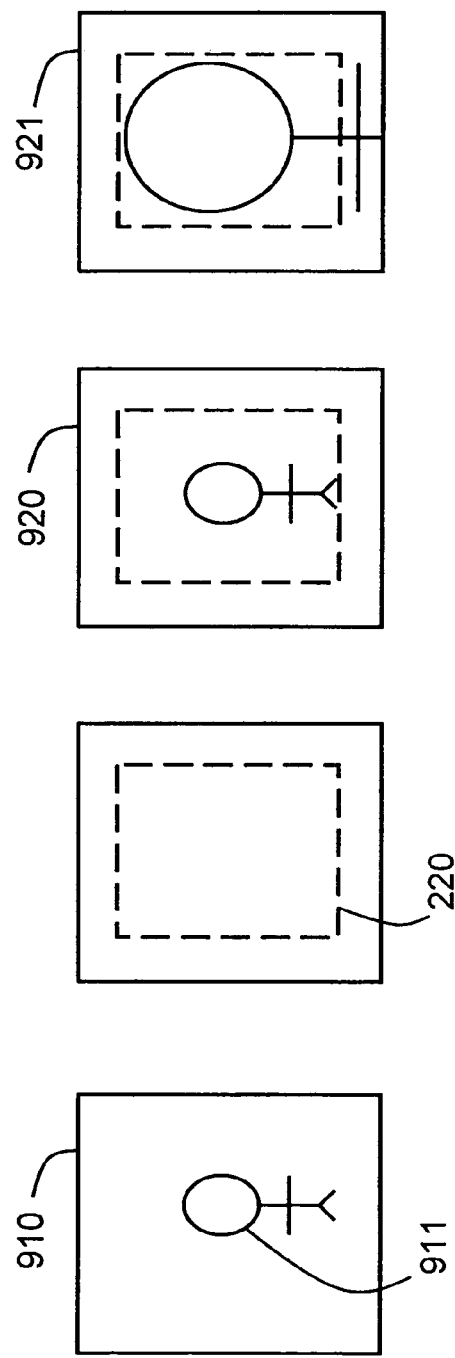
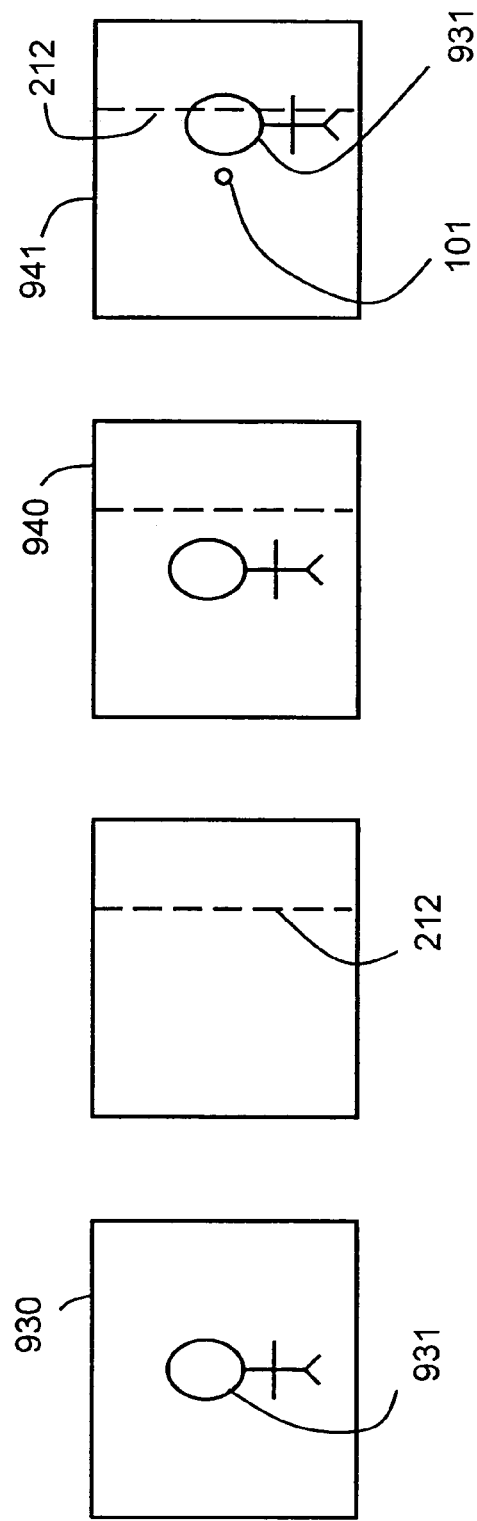
Fig 9A
Fig 9B

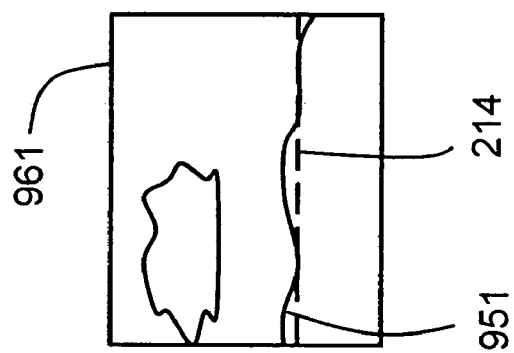
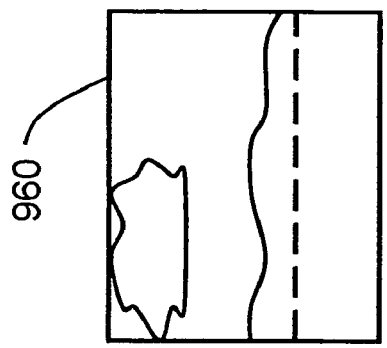
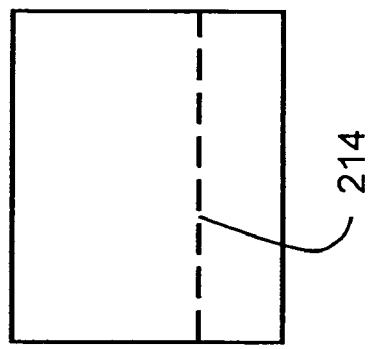
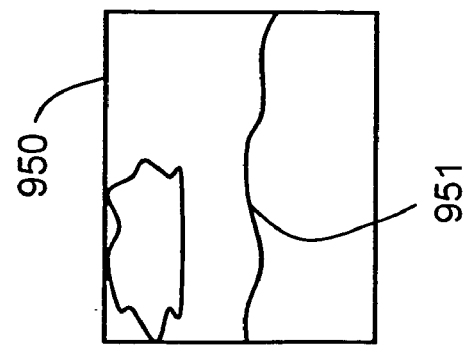
Fig 9C

PICTURE COMPOSITION GUIDE

TECHNICAL FIELD OF THE INVENTION

The present invention relates generally to the field of digital photography, and in particular to a camera providing picture composition guidance to a user of the camera through composition guide markers displayed on a display device of the camera.

BACKGROUND ART

Digital cameras have introduced an increased level of sophistication and capabilities. Currently even entry-level consumer cameras have a plethora of settings and options designed for taking pictures in different photographic conditions. Such include automatic focus, and automatic aperture and shutter speed settings.

Digital cameras are also becoming increasingly affordable. Unfortunately, as cameras are becoming more affordable, the sophistication of the users is reduced. Accordingly, most users do not understand the concept of horizons, diagonals and strong points, and how to use such features when composing a photograph. As a result most users instinctively line up the subject of a photographic scene with the centre of the viewfinder of the camera. This composition mistake usually results in photographs that are uninteresting and bland.

Generally a good understanding of elements of composition is required in order to capture a good photograph. Such elements include subject size, subject placement, the concept of balance, eliminating dead space, the direction of leading lines, subject framing and the like. While modern cameras have improved the technical aspects of photography, camera manufactures have not successfully implemented proven ways to help camera users improve picture composition.

FIG. 1 shows a viewfinder 100 of a conventional camera. The viewfinder 100 includes a composition guide in the form of a marker 101 positioned in the centre of the viewfinder 100. The marker 101 illustrated is in the form of a circle, but is also often in the form of a box or a cross. The viewfinder 100 also includes additional markers 111 through 114 for indicating the field of view that would be captured by the camera. Markers 111 through 114 help the user of the camera to frame a photographic image. However, markers 111 through 114 do not aid the user in obtaining a more pleasing picture composition.

Some prior art cameras attempt to overcome this deficiency by providing additional composition guide markers in the viewfinder, with the composition guide markers derived from well-known composition rules. Such composition guide markers include: (a) horizontal lines dividing the visual field into thirds, (b) "strong" composition points, and (c) two diagonal lines intersecting one third of the way in the lower half of the visual field. In these prior art cameras the user is required to manually select a marker which is appropriate for a current photographic scene from the different composition guide markers provided. However, such a selection can only be made properly if the user has a good understanding of the various photographic composition rules. In the absence of such understanding the composition guide markers provided may not provide significant assistance to the novice user. In addition, an attempt to select the appropriate composition marker takes time, which may cause the photographic moment to be lost.

A composition guidance system exists in a prior art camera which consists of one of three different fixed markers in the form of outlines indicating the size of subjects, with the system deciding which of the three fixed markers to use by taking account of the camera's lens focal distance. A camera system has also been proposed in the prior art which utilises a template as the picture composition guide. Both types of composition guides limit a photographic scene to the selected marker. In other words, the composition guide marker remains the same irrespective of the photographic scene.

In the art there is disclosed a camera system capable of analysing a photographic scene at either the pre capture or the post capture stage and then providing suggestions to the camera user in order to "correct" a bad composition. In the case of post capture analysis the composition suggestion system provides a set of cropped images correcting the composition mistake. Cropping is limited to the original captured photographic scene. Therefore the cropped images are often undesirable because they are lower in resolution compared to the original image. In the case of pre capture analysis the composition suggestion system interactively provides instructions for moving the camera in a direction specified by the camera system. These types of active composition suggestions have the disadvantage of taking the creativity away from the user.

In view of the foregoing there is a need for a user-friendly picture composition guidance system that leaves creativity solely in the hands of a camera user and assists the user in taking good pleasing pictures.

SUMMARY

It is an object of the present invention to substantially overcome, or at least ameliorate, one or more disadvantages of existing arrangements.

According to a first aspect of the invention, there is provided a method of providing a picture composition guide on a display device of a camera, said method comprising the steps of:

detecting settings of said camera;

performing image analysis on an image being displayed on said display device, said image representing a photographic scene;

determining the presence and location of strong features based on the result of said image analysis;

selecting one or more markers dependent upon said camera settings and said strong features; and superimposing said one or more markers over said image on said display device.

According to another aspect of the invention, there is provided a method of providing a picture composition guide on a display device of a camera, said picture composition guide useful for assisting a user to capture a sequence of panoramic photographs with said camera, said method comprising the steps of:

detecting a panorama mode of said camera;

detecting an orientation of said camera;

performing image analysis on an image being displayed on said display device, said image representing a photographic scene;

detecting the location of a horizon in said image;

selecting a horizontal line marker dependent upon said detected camera orientation and the position of said location of said horizon;

superimposing said horizontal line marker over said image on said display device; and retaining said horizontal line marker after the capture of a first image, said horizontal line marker being useful for assisting said user to subsequent images in said sequence of panoramic photographs.

Other aspects are also disclosed.

BRIEF DESCRIPTION OF THE DRAWINGS

Some aspects of the prior art and one or more embodiments of the present invention will now be described with reference to the drawings, in which:

FIG. 4A illustrates the camera in the horizontal orientation;

FIGS. 4B and 4C illustrate the camera in vertical orientations;

FIGS. 9A to 9C show sequences of events where a camera user decides to take a particular example image;

DETAILED DESCRIPTION INCLUDING BEST MODE

Figure 1:
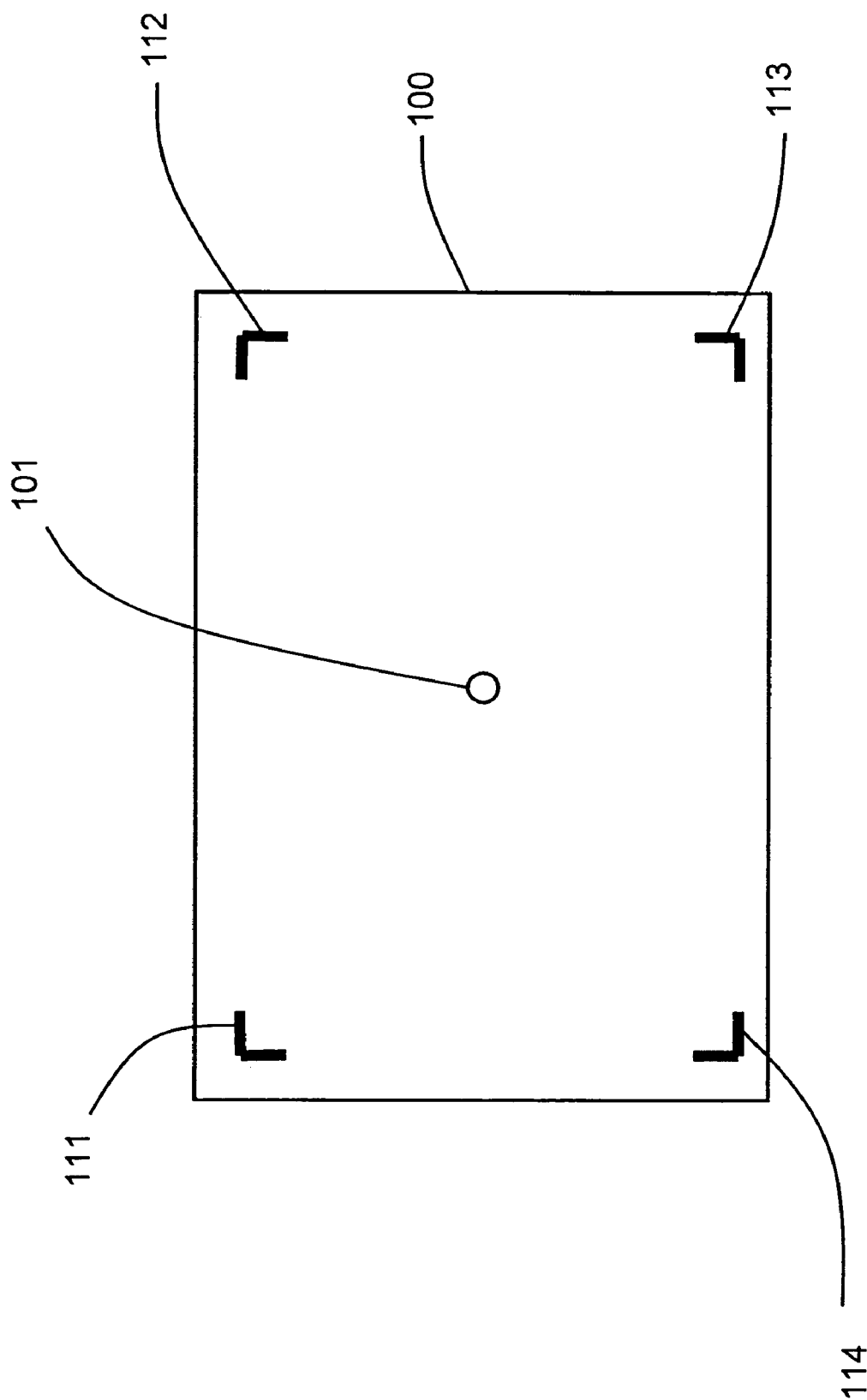
FIG. 1 shows a viewfinder of a conventional camera.

Where reference is made in any one or more of the accompanying drawings to steps and/or features, which have the same reference numerals, those steps and/or features have for the purposes of this description the same function(s) or operation(s), unless the contrary intention appears.

Figure 2:
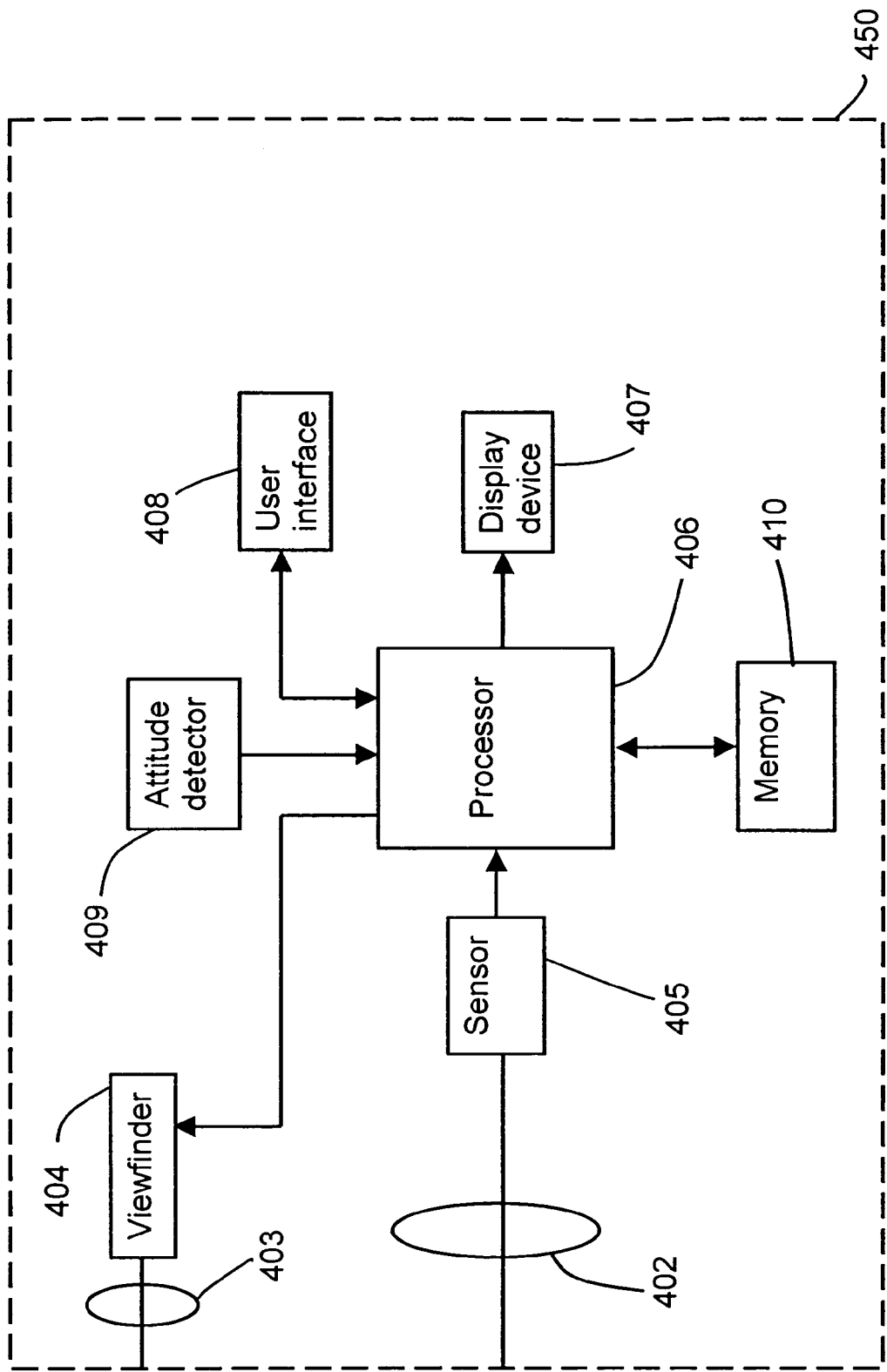
FIG. 2 shows a schematic block diagram of a digital camera.

FIG. 2 shows a schematic block diagram of a digital camera 450. The digital camera 450 comprises a lens system 402 through which light from a photographic scene is optically focused onto an image sensor 405. The image sensor 405 comprises a two-dimensional array of photosensitive elements, with each photosensitive element recording the intensity of light falling thereon for providing an image pixel value. The photosensitive elements are typically of Charged Coupled Device (CCD) or Complementary Metal Oxide Semiconductor (CMOS) technology. Pixel data is passed from the image sensor 405 to a processor 406 for processing and storage onto a memory unit 410. The pixel data represents the photographic scene.

The digital camera 450 typically has a display device 407 formed from a Liquid Crystal Display (LCD), which is typically controlled by the processor 406 to display a down-sampled version of the pixel data captured by the image sensor 405. A viewfinder 404 is also provided, allowing the user to compose an image of the photographic scene to be captured, with the image being visible through lens 403. In an alternative implementation viewfinder 404 and image sensor 405 share the same light path.

A user interface 408 is also provided for allowing the user to control the camera 450, through controlling processor 406, by selecting and setting various camera settings. Such settings include selecting a specific photographic mode, an exposure compensation, a particular white balance, and triggering a shutter release button to capture the photographic scene. Examples of photographic modes include portrait mode, landscape mode, close-up mode, action mode, program mode, aperture priority mode, shutter priority mode and depth of field mode.

The camera 450 also includes an attitude detector 409 for detecting the orientation of the camera 450 and providing orientation data to the processor 406. In particular, the attitude detector 409 detects whether the camera 450 is in the vertical or the horizontal orientation. With the viewing field in the viewfinder 404 being rectangular, the vertical orientation of the camera 450 refers to the position in which the major (long) sides of the viewing field is vertical, whereas the horizontal orientation refers to the position in which the major sides of the viewing field is horizontal. FIG. 4A illustrates the camera 450 in the horizontal orientation, whereas FIGS. 4B and 4C illustrates the camera 450 in vertical orientations.

Figure 3:
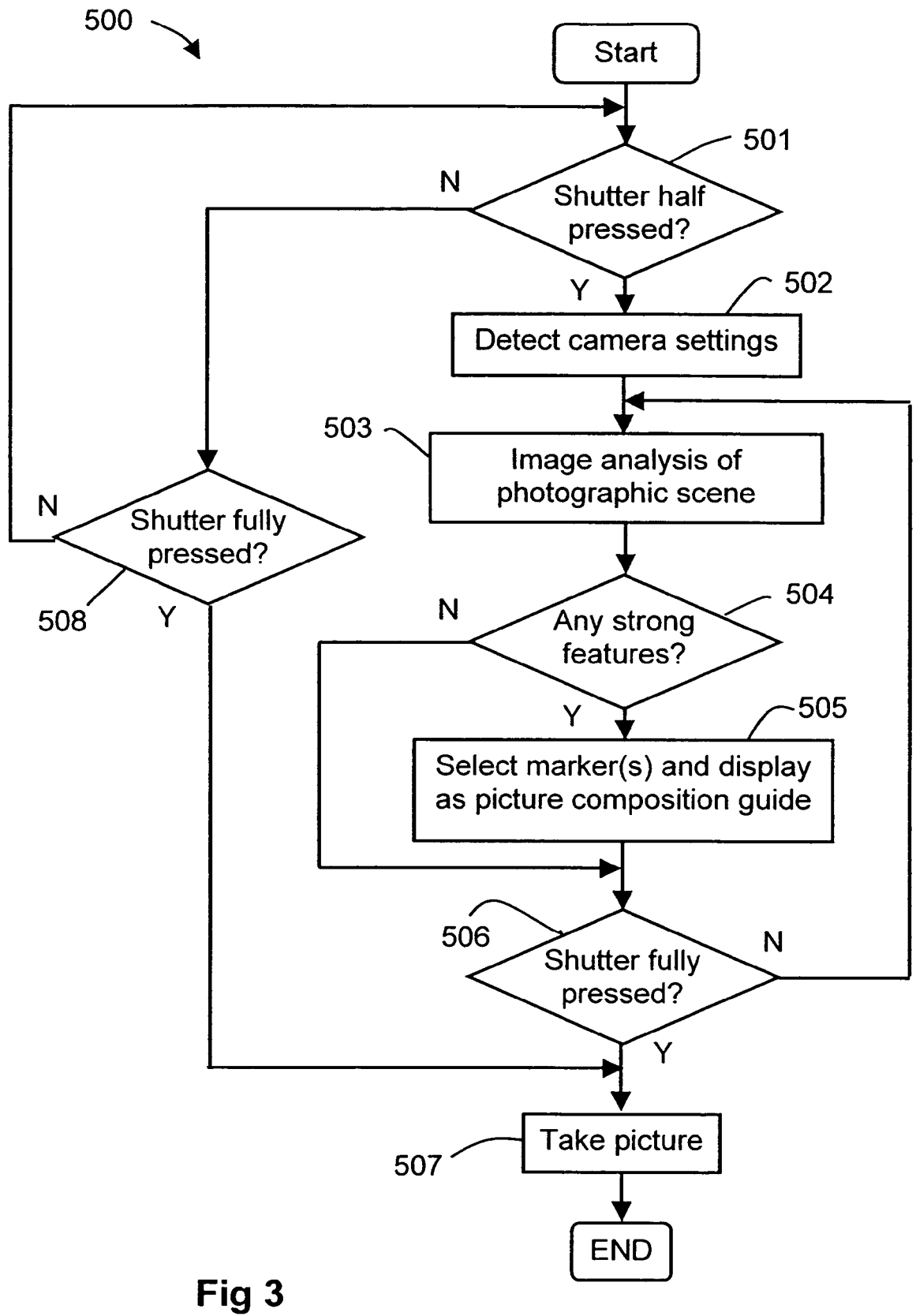
FIG. 3 shows a schematic flow diagram of a method of invoking a picture composition guide on a display device of the camera shown in FIG. 2.

FIG. 3 shows a schematic flow diagram of a method 500 of invoking a picture composition guide on the display device 407 of the camera 450 shown in FIG. 2 when taking a photograph with the camera 450. The steps of method 500 are performed by the processor 406 and are controlled by a program executing within the processor 406. Typical, before controlling the camera 450 to capture an image, the camera user first pre-selects relevant camera settings and then holds the camera 450 in position such that the camera 450 points towards a desired photographic scene. The camera user then half presses the shutter release button, which is part of the user interface 408.

Method 500 starts in step 501 where the processor 406 determines whether the shutter release button has been half pressed. If it is determined that the shutter release button has not been half pressed, the processor 406 then, in step 508, determines whether the shutter release button has been fully pressed. If it is determined that the shutter release button has not been fully pressed, then control returns to step 501.

In the case where the processor 406 determines in step 501 that the shutter release button has been half pressed, method 500 continues to step 502 where the processor 406 detects the camera settings including the photographic mode, and the orientation data from the attitude detector 409. The processor 406 also controls the camera 450 to perform a range of functions such as auto-focusing, exposure metering and the like.

Step 503 follows where the processor 406 performs image analysis of the pixel data from the image sensor 405, and in particular of the photographic scene represented by the pixel data. The analysis is to detect and locate "strong" features in the photographic scene. Such "strong" features include main subjects, the horizon and strong diagonal features. A detailed description of the image analysis step 503 is provided below.

In step 504 the processor 406 then determines whether any strong features were detected in step 503. If it is determined that one or more strong features were detected in step 503, then the method 500 proceeds to step 505 where the processor 406 selects one or more markers from the available markers, and displays those markers superimposed over the image of the photographic scene on the display device 407.

Figure 5:
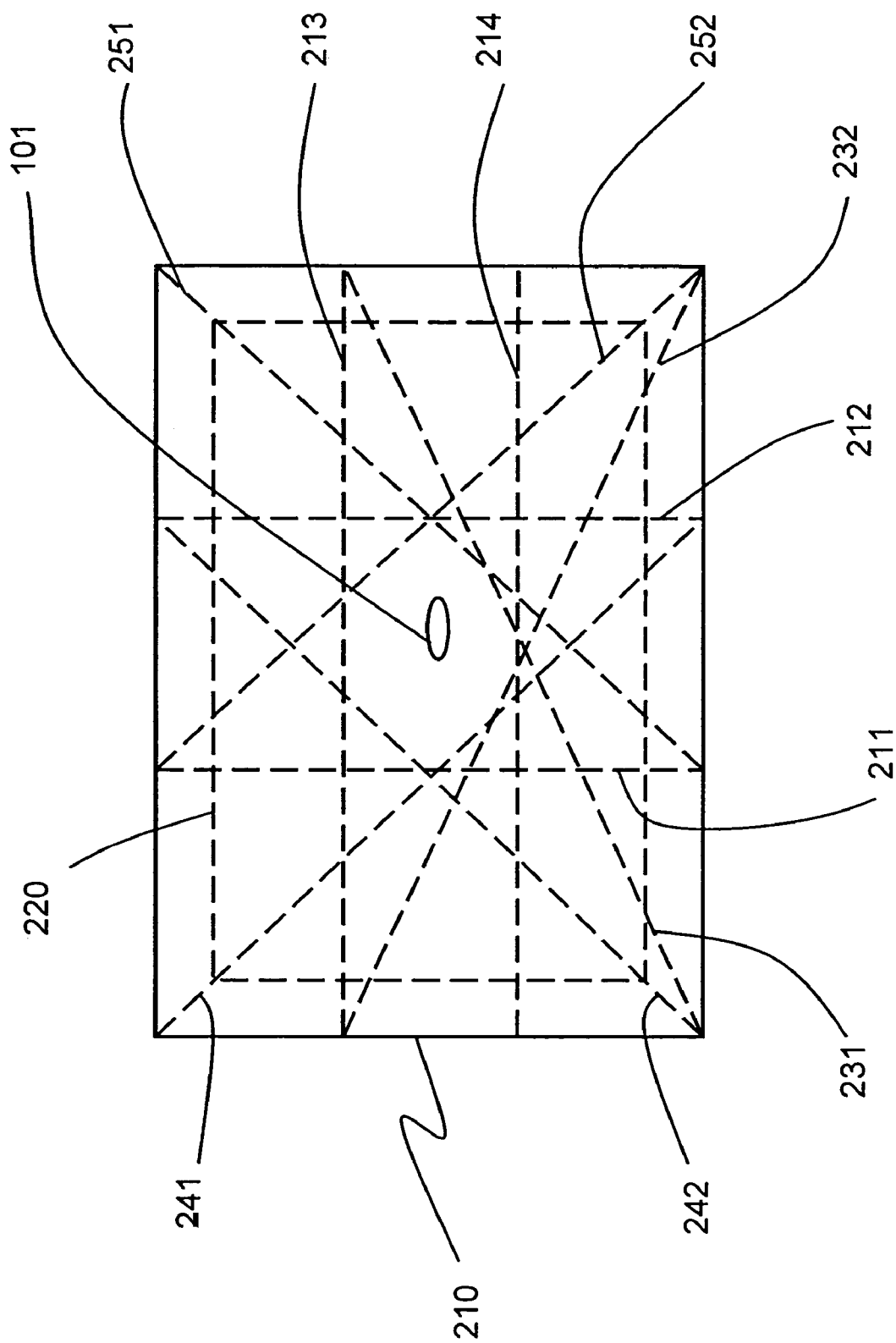
FIG. 5 shows the viewing field of the camera with all the available markers displayed.

FIG. 5 shows the viewing field 210 of the camera 450 with all the available markers displayed. The viewing field 210 corresponds with the field of view that would be captured by the image sensor 405. The available markers include a set of horizontal and vertical dashed line markers 211, 212, 213 and 214 dividing the viewing field 210 into an even grid of three by three rectangles. The available markers also include diagonal dashed line markers 231, 232, 241, 242, 251 and 252. Each of the line markers 231, 232, 241, 242, 251 and 252 connects a corner of the viewing field 210 with a point ⅓ away from the opposite corner. The available markers further include a dashed bounding box marker 220 covering approximately 90% of the viewing field 210 centred approximately on marker 101.

Referring again to FIG. 3, if it is determined in step 504 that no strong features were detected in step 503, or after the processor 406 has displayed the selected one or more markers from the available markers in step 505, method 500 continues to step 506 where the processor 406 determines whether the shutter release button has been fully pressed. If it is determined that the shutter release button has not been fully pressed, then method 500 returns to step 503 from where steps 503 to 506 are repeated. Hence, method 500 continues to analyse the photographic scene represented by the pixel data from the image sensor 405 and continues to select and display markers on the display device 407 when strong features are detected, until the shutter release button is fully pressed.

If it is determined in step 506 that the shutter release button has been fully pressed, then in step 507 the processor 406 captures the image formed on the image sensor 405 by storing the pixel data. Method 500 then ends.

Referring again to step 508, if it is determined that the shutter release button has been fully pressed without being half pressed, then method 500 continues directly to step 507 where the processor 406 captures the image formed on the image sensor 405 by storing the pixel data. Hence, no image analysis is performed and no markers are displayed.

The image analysis performed in step 503 is now described in more detail with reference to FIGS. 6A to 6C wherein schematic flow diagrams are shown of image analysis method 503A of detecting the location of a horizon in the photographic scene, method 503B of detecting the location of a strong diagonal feature, and method 503C of detecting a subject in the photographic scene represented by the pixel data from the image sensor 405.

Method 503A (FIG. 6A) starts in step 711 where a down-sampled version of the image displayed on the display device 407 is extracted, and an intensity image is formed by converting the pixel values of the down-sampled version of the image into intensity values. The advantage gained by using a down-sampled version of the image instead of the image itself is processing speed. Step 712 follows where the processor 406 uses a Gaussian filter with a blur radius of 11 by 11 pixels to smooth the intensity image formed in step 711. The processor 406 further applies in step 713 an edge detection operation, using a Sobel edge detector, to the Gaussian filtered image from step 712. The result from the edge detection operation is also normalised to the range between 0 and 1. In step 714 the processor 406 applies a thresholding operation to the result of step 713, using preferably 0.02 as the threshold value. Finally, in step 715, the location of the horizon is detected by summing the rows of the threshold image from step 714 and locating the peak of the summed rows. The peak location corresponds to the location of the horizon in the photographic scene.

Referring now to method 503B shown in FIG. 6B, method 503B starts with steps 711 to 714 which have the same description as those described in detail with reference to FIG.

6A. Step 725 follows where the processor 406 applies a Hough transform to the image resulting from step 714 to locate the position of a diagonal feature. The diagonal feature is a straight line feature, and details of using the Hough transform to locate straight line features in an image is well known in the art, and will not be discussed here.

Figure 6A:
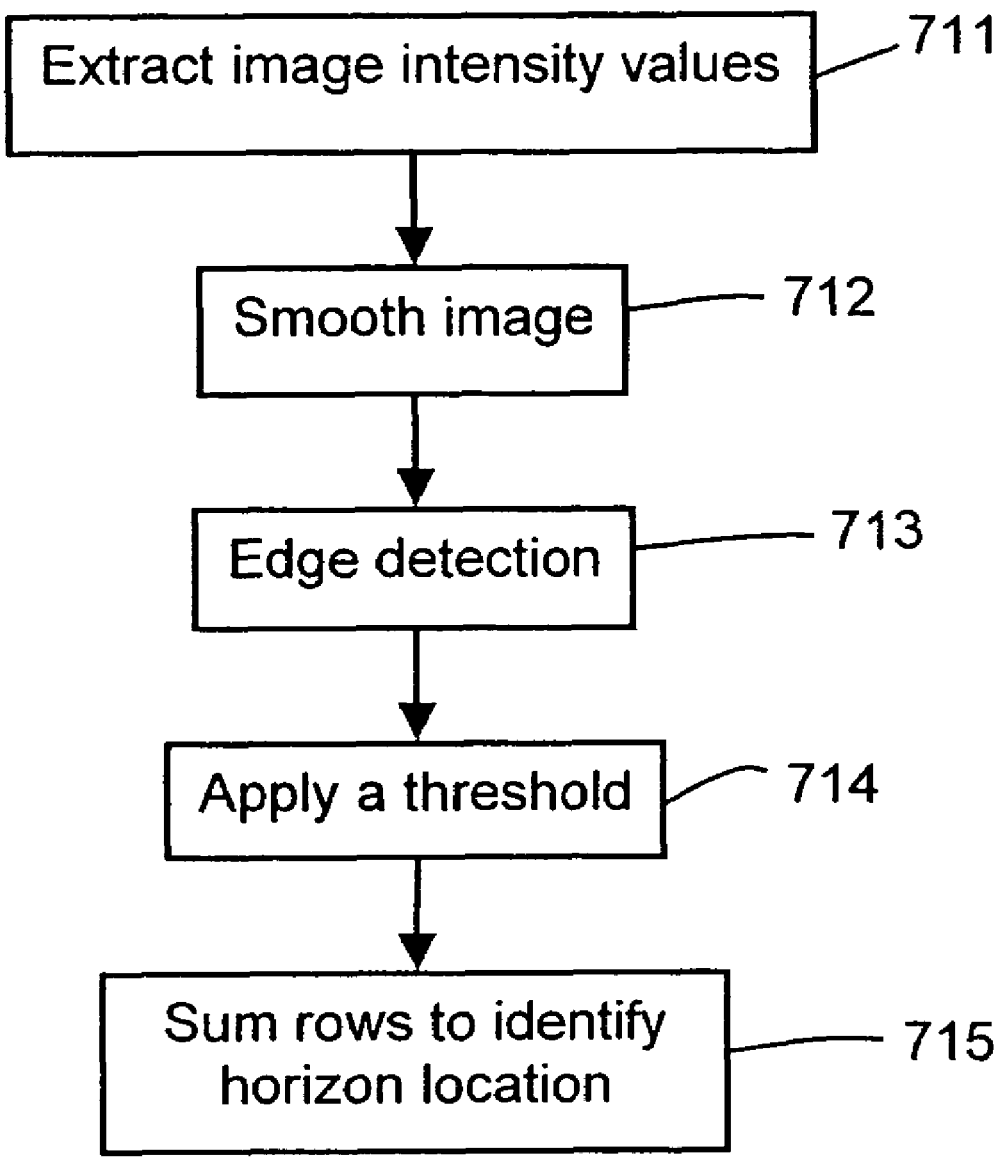
FIG. 6A shows a schematic flow diagram of image analysis method of detecting the location of a horizon in a photographic scene.
Figure 6B:
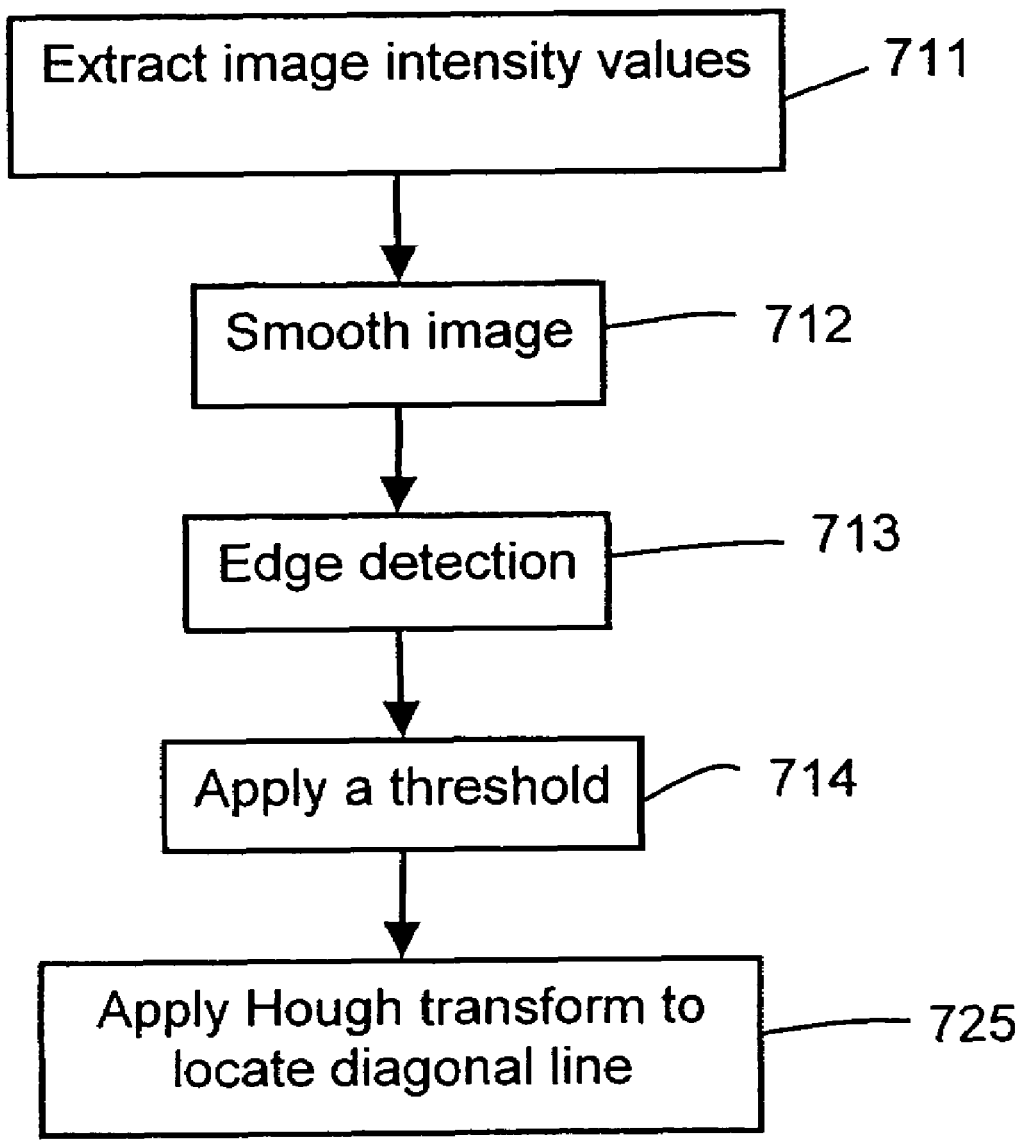
FIG. 6B shows a schematic flow diagram of image analysis method of detecting the location of a strong diagonal feature in a photographic scene.
Figure 6C:
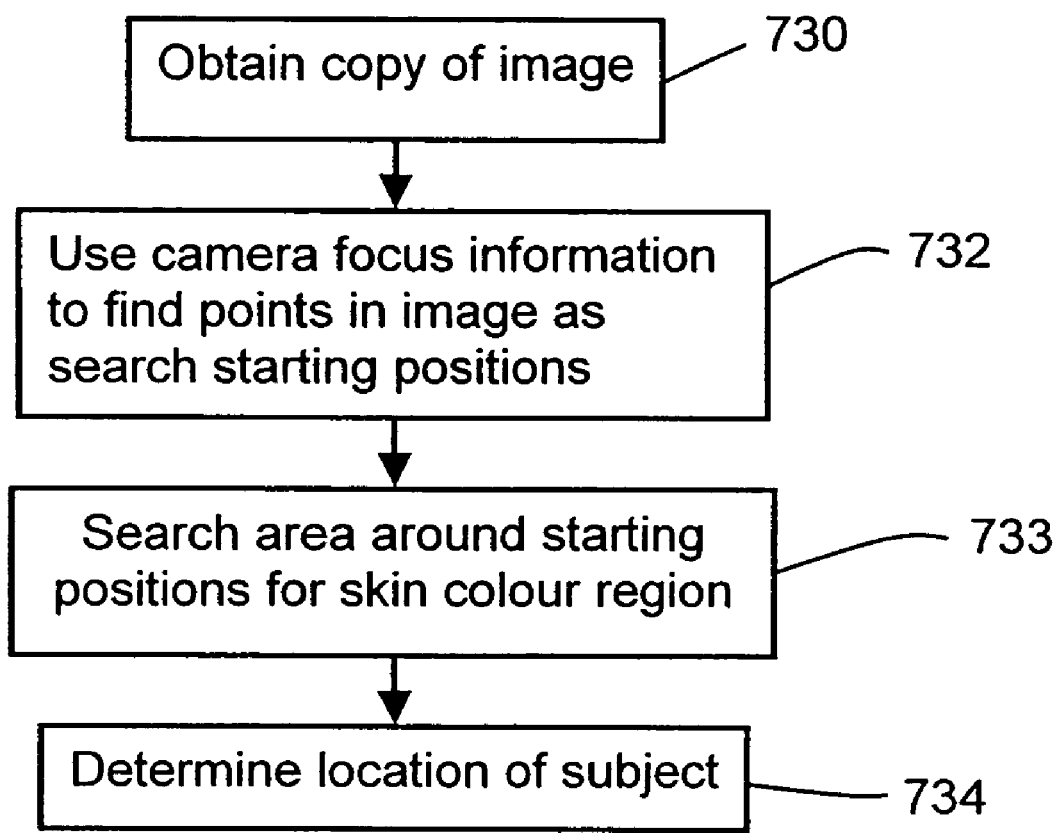
FIG. 6C shows a schematic flow diagram of image analysis method of detecting a subject in a photographic scene.

Referring now to method 503C shown in FIG. 6C, method 503C starts with step 730 where a copy of the image displayed on the display device 407 is obtained. In step 732 the points in the image are extracted that are equivalent to the points in the viewfinder 404 used by the camera 450 for its auto focus functionality.

In step 733 the processor 406 then performs a search within window regions centred about each of the points extracted in step 732 for groups of pixels corresponding to skin colour. In particular, the processor 406 determines for each window region whether that window region contains a group of pixels that is greater in size than one sixteenth the size of the image that has the colour of human skin. In the preferred implementation the size of each window region is approximately one ninth the size of the image.

In the case where it is determined that one or more window regions contain such groups of pixels, those window regions are further analysed to determine the exact location of each instance of skin colour pixel groups in step 734. Each of those locations mark the location of a subject of interest in the photographic scene.

Figure 7:
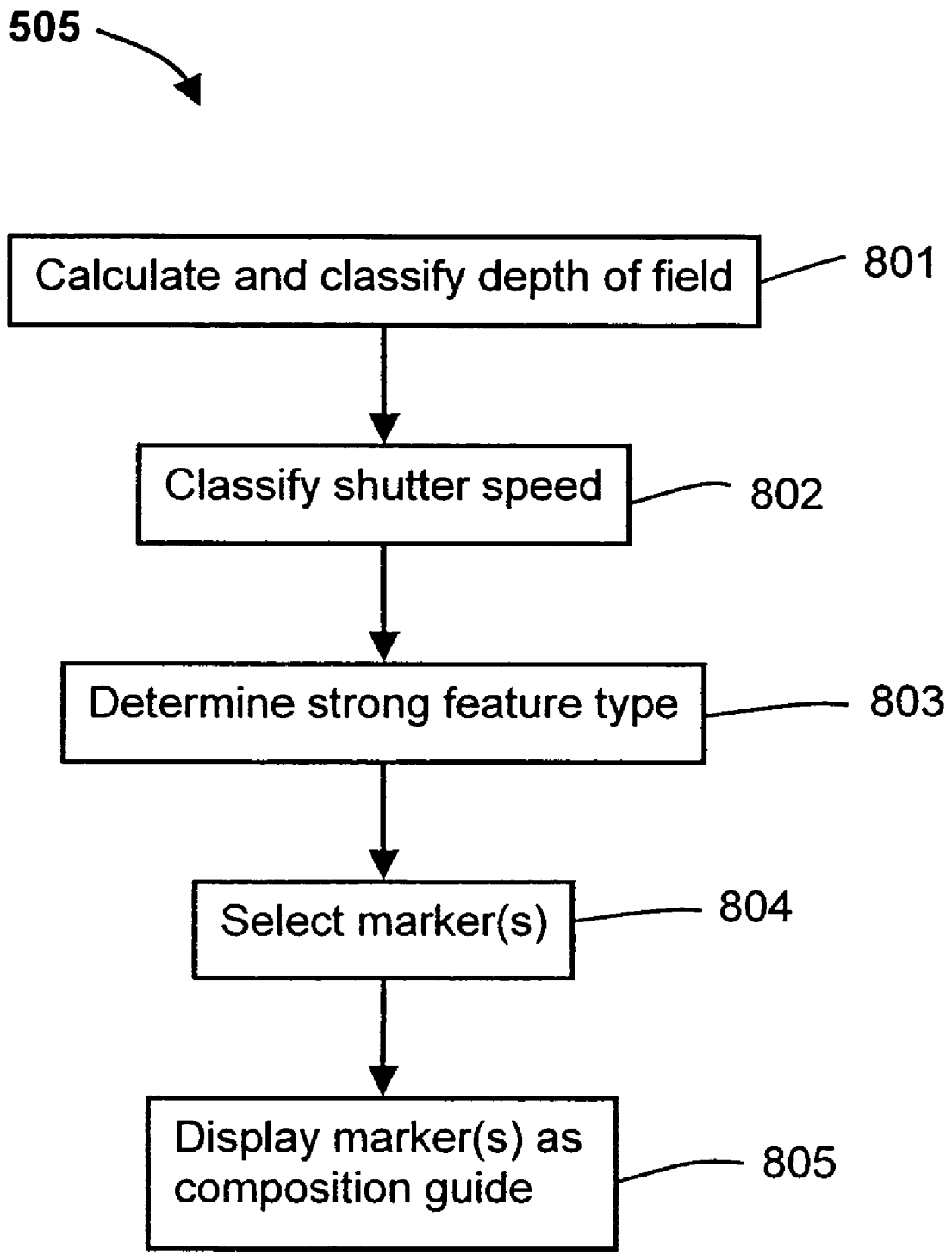
FIG. 7 shows the a schematic flow diagram of sub-steps of a step of selecting one or more markers from the available markers, and displaying those markers as a picture composition guide to the user.

With the image analysis performed in step 503 described in detail, step 505 (FIG. 3) where the processor 406 selects one or more markers from the available markers is described in more detail, with the available markers shown in FIG. 5. In the preferred implementation the processor 406 uses the photographic mode, the orientation of the camera 450 received from the attitude detector 409, and the image feature(s) and location(s) detected in step 505 to select one or more markers from the available markers, with the image features being a horizon, a strong diagonal feature and one or more subjects. FIG. 7 shows the a schematic flow diagram of sub-steps of step 505 of selecting one or more markers from the available markers, and displaying those markers as a picture composition guide to the user.

Step 505 starts in sub-step 801 where the processor 406 calculates the depth of field (dof) from the current camera settings obtained in step 502 (FIG. 3), and in particular from the aperture setting and focal distance, as is known in the art. The depth of field is then classified as either "large" or "small". Preferably any depth of field larger than 2 meters is classified as "large" and a depth of field less than, or equal to, 2 meters is classified as "small".

In step 802 the current shutter speed of the camera 450 is classified as being "slow" or "fast". Preferably shutter speeds less than, and equal to, ¹⁄₁₀₀ second are classified as being "fast", whereas shutter speeds greater than ¹⁄₁₀₀ second are classified as being "slow".

Next in step 803 the processor 406 determines the type of strong features detected during the image analysis performed in step 503. In step 804 the processor 406 then selects one or more markers based on the photographic mode, orientation, and the type and location of the image feature detected. Table 1 below lists examples of picture composition guide markers that may be selected by the processor 406 for specific photographic modes, orientations, and image features. Step 505 ends in sub-step 805 where the selected markers are displayed as the picture composition guide.

Figure 8F:
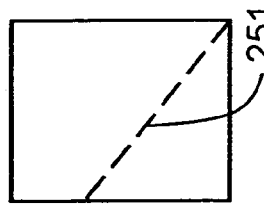
FIGS. 8A to 8N show subsets of the line markers shown in FIG. 5 as those line markers are used as the picture composition guide.
Figure 8E:
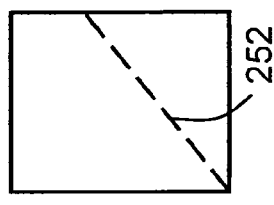
Figure 8D:
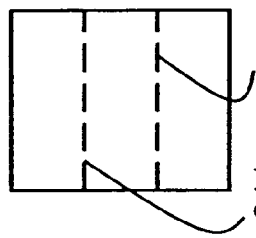
Figure 8C:
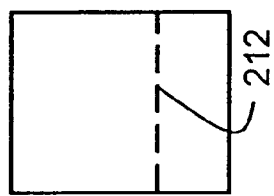
Figure 8B:
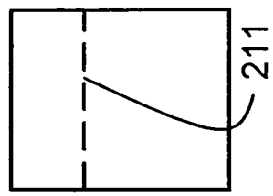
Figure 8A:
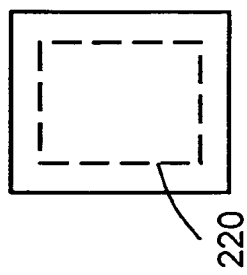
Figure 8K:
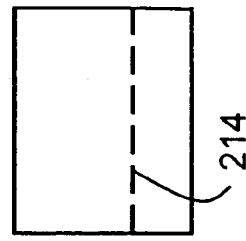
Figure 8J:
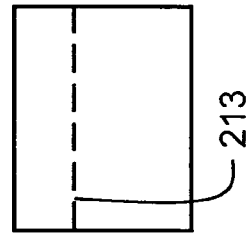
Figure 8I:
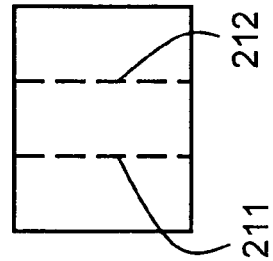
Figure 8H:
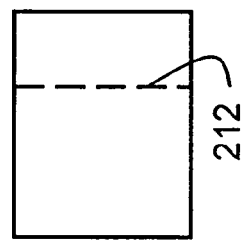
Figure 8G:
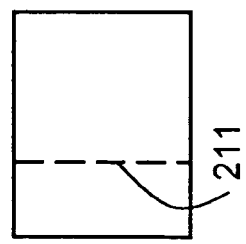
Figure 8N:
Figure 8M:
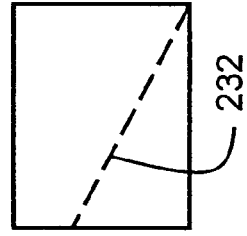
Figure 8L:
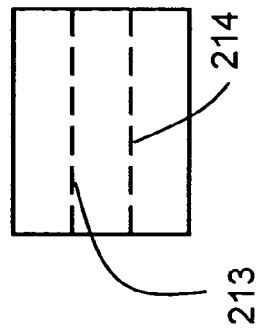

FIGS. 8A to 8N show subsets of the line markers 211 to 252 shown in FIG. 5 as the line markers 211 to 252 are used as the picture composition guide. The markers 211, 212, 220, 251 and 252 shown for a vertical orientation relate to the vertical orientation when the camera 450 is rotated 90 degrees clockwise from its horizontal orientation, that is the orientation shown in FIG. 4B. Similar marker and marker combinations exist for the vertical orientation shown in FIG. 4C.

TABLE 1

| Photographic mode | Camera orientation | Image feature | Composition marker |
|---|---|---|---|
| Portrait | Vertical | — | Bounding box 220 |
|  | Horizontal | Subject | Line 211 and/or 212 |
| Landscape | Vertical | Horizon | Line 211 and/or 212 |
|  |  | Diagonal feature | Line 251 or 252 |
|  | Horizontal | Horizon | Line 213 and/or 214 |
|  |  | Diagonal feature | Line 231 or 232 |
| Close-up | — | — | Bounding box 220 |
| Action | Vertical | — | Bounding box 220 |
|  | Horizontal | Subject | Line 211 and/or 212 |
| Program (small dot) | Vertical | — | Bounding box 220 |
| Program (large dot) | Vertical | Horizon | Line 211 and/or 212 |
|  |  | Diagonal feature | Line 251 or 252 |
| Program (small dot) | Horizontal | Subject | Line 211 and/or 212 |
| Program (large dot) | Horizontal | Horizon | Line 213 and/or 214 |
|  |  | Diagonal feature | Line 231 or 232 |
| Shutter priority (Tv) (slow shutter speed) | Vertical | Horizon | Line 211 and/or 212 |
|  |  | Diagonal feature | Line 251 or 252 |
| Tv (slow shutter speed) | Horizontal | Horizon | Line 213 and/or 214 |
|  |  | Diagonal feature | Line 231 or 232 |
| Tv (fast shutter speed) | Vertical | — | Bounding box 220 |
| Tv (fast shutter speed) | Horizontal | Subject | Line 211 and/or 212 |
| Aperture priority (Av) (small dot) | Vertical | — | Bounding box |
| Av (small dot) | Horizontal | Subject | Line 211 and/or 212 |
| Av (large dot) | Vertical | Horizon | Line 211 and/or 212 |
|  |  | Diagonal feature | Line 251 or 252 |
| Av (large dot) | Horizontal | Horizon | Line 213 and/or 214 |
|  |  | Diagonal feature | Line 231 or 232 |

Referring also to Table 1, in a first example, when the camera 450 is in a "portrait mode" and the orientation is vertical then, irrespective of the image feature detected, bounding box marker 220 (FIG. 8A) is displayed on the display device 407 as the picture composition guide.

When the camera 450 is in the portrait mode and the orientation is horizontal, then line marker 211 (FIG. 8G) is displayed if a subject is located in the left half of the visual field. Similarly, line marker 212 (FIG. 8H) is displayed if a subject is located in the right half of the visual field. In the case where two or more subjects are detected in the photographic scene then line markers 211 and 212 are displayed together as shown in FIG. 8I.

In a second example, if the photographic mode is set to "landscape mode" and the camera orientation is vertical, then line marker 211 (FIG. 8B) is selected and displayed if a horizon is located in the top half of the visual field. However if the horizon is located in the bottom half of the visual field then line marker 212 (FIG. 8C) is displayed instead. Similarly, if the photographic mode is set to "landscape mode" and the camera orientation is vertical, then line marker 252 (FIG. 8E) or 251 (FIG. 8F) is selected and displayed dependent on the direction of a detected diagonal feature.

In a third example, if the camera 450 is set to "program mode", the camera orientation is horizontal, and the depth of field is calculated and classified as "large", then line marker 213 (FIG. 8J) is selected and displayed if a horizon is located in the top half of the visual field. If the horizon is located in the bottom half of the visual field then line marker 214 (FIG. 8K) is selected and displayed.

The use of the picture composition guide provided by the markers 211 to 252 is now described by way of further examples. FIG. 9A shows a sequence of events where a camera user decides to take a portrait image of a single subject 911. The camera user has set the photographic mode to "portrait mode" and decides to hold the camera in the vertical orientation. Assuming other necessary camera settings have also been pre-set, the camera user then points the camera at subject 911 and composes an image 910. Once the user half presses the camera's shutter release button, method 500 (FIG. 3) selects the most appropriate marker as picture composition guide for display according to the photographic scene and the camera orientation. Based on scene 910 and Table 1, method 500 selects composition guide consisting of bounding box marker 220 and overlays marker 220 on scene 910, thereby producing scene 920. The camera user then uses bounding box marker 220 as a guide to recompose the scene 920 to produce scene 921. Once satisfied with the composition, the camera user can fully press the shutter release button to take a photograph of the photographic scene 921 (without the bounding box marker 220).

According to a further example, FIG. 9B shows a sequence of events where a camera user decides to take a portrait image of a single subject 931. This time the user decides to hold the camera 450 in the horizontal orientation. Again assuming all the necessary camera settings have been pre-set and that the camera's photographic mode is set to "portrait mode", the user composes an image 930 and half presses the shutter release button. Upon this action and based on scene 930 and Table 1, method 500 selects composition guide consisting of marker line 212 because subject 931 is determined by step 505 to lie in the right side of the visual field. Marker line 212 is also overlayed on scene 930, thereby producing scene 940. The camera user then uses marker line 212 as a guide to recompose the scene 940 to produce scene 941. In particular, subject 931 is moved towards marker line 212 and away from the center 101 of the visual field. Once satisfied with the composition, the camera user can fully press the shutter release button to take a photograph of the photographic scene 941 (without the marker line 212).

According to yet another example, FIG. 9C shows a sequence of events where a camera user decides to take a landscape image 950 and holding the camera horizontally. Again assuming all the necessary camera settings have been pre-set and that the camera's photographic mode is set to "landscape mode", the user composes image 950 and half presses the shutter release button. Upon this action method 500 selects, based on scene 950 and Table 1, composition guide consisting of marker line 214. This is because the horizon 951 detected in step 503 is located in the lower half of the viewing field. Marker line 214 is also overlayed on scene 950, thereby producing scene 960. The camera user then uses marker line 214 as a guide to recompose the scene 950 to produce scene 961. In particular, the horizon 951 is moved towards marker line 214. Once satisfied with the composition, the camera user can fully press the shutter release button to take a photograph of the photographic scene 961 (without the marker line 214).

Figure 10:
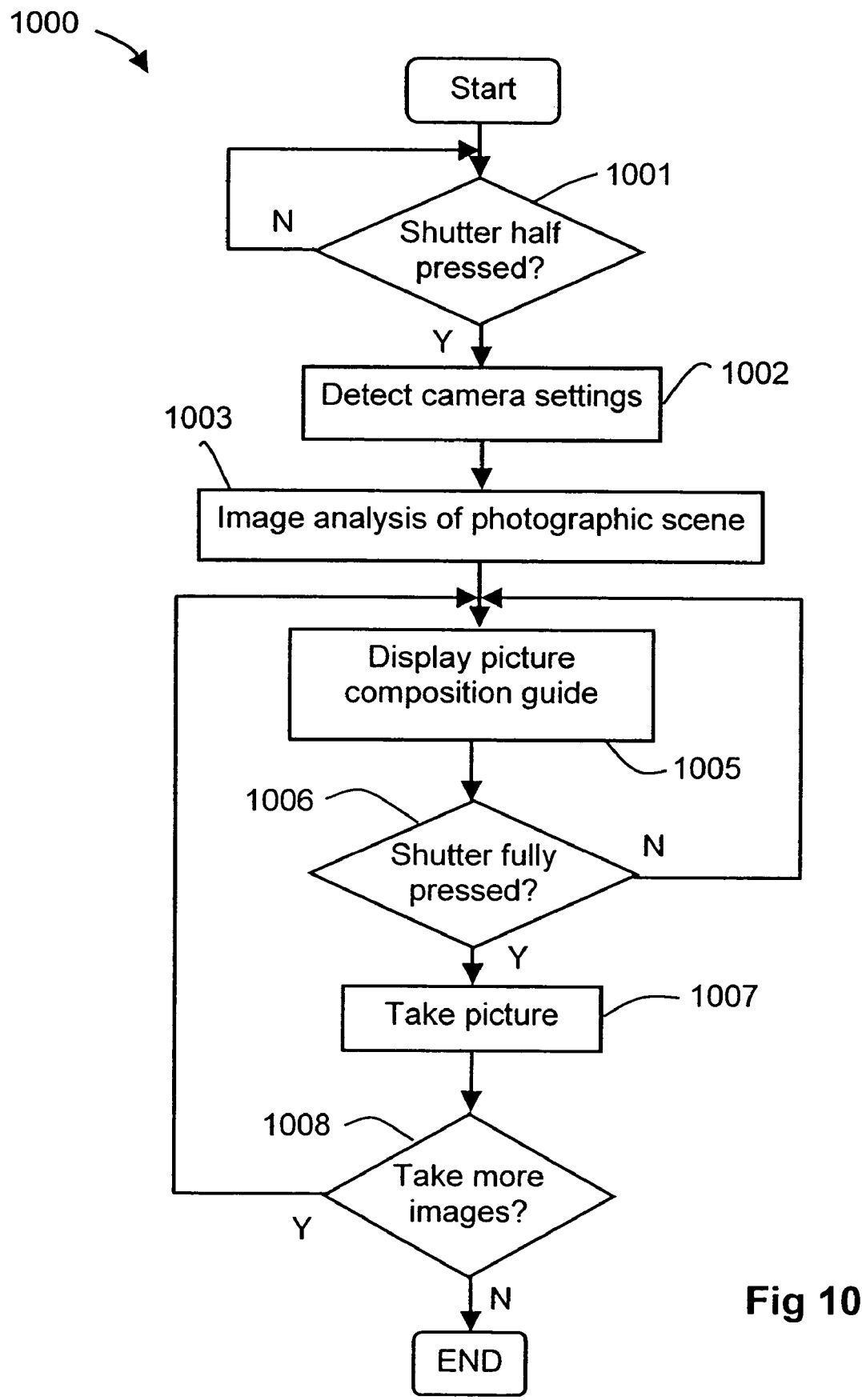
FIG. 10 shows a schematic flow diagram of a method of displaying a picture composition guide while the camera is in a panorama-stitch mode.

In addition to the photographic modes described above in which case the camera 450 uses method 500 to invoke a picture composition guide, camera 450 is also equipped with a "panoramic-stitch mode". FIG. 10 shows a schematic flow diagram of a method 1000 of displaying a picture composition guide while the camera 450 is in the panorama-stitch mode. It is assumed that the camera user has pre-set the photographic mode of the camera 450 as "panorama-stitch mode", thereby invoking method 1000, and has set all the necessary camera settings.

Method 1000 starts in step 1001 where the processor 406 determines whether the shutter release button has been half pressed. If it is determined that the shutter release button has not been half pressed, then processing returns to step 1001. Once the processor 406 determines that the shutter release button has been half pressed then the processor 406 detects in step 1002 the camera settings including the orientation data from the attitude detector 409.

In step 1003 the photographic scene represented by the pixel data from the image sensor 405 is analysed by the processor 406 for detecting the presence and location of a horizon in the manner described with reference to method 503A (FIG. 6A). In step 1005 that follows, the processor 406 selects one of line markers 211, 212, 213 or 214 according to the location of the horizon detected in step 1003 and the orientation of the camera 450. For example, if the location of the horizon is determined to lie in the top half of the visual field frame and the camera orientation is vertical, then line marker 211 is displayed. However, if the camera orientation is horizontal, then marker 213 is displayed instead.

Method 1000 then continues to step 1006 where the processor 406 determines whether the shutter release button has been fully pressed. If it is determined that the shutter release button has not been fully pressed, then method 1000 returns to step 1005. Alternatively, if it is determined that the shutter release button has been fully pressed, then the processor 406 in step 1007 captures the image formed on the image sensor 405 by storing the pixel data. It is then determined in step 1008 whether more images are to be taken. If no more images are to be taken, then method 1000 ends.

However, if it is determined in step 1008 that more images are to be taken, then processing returns to step 1005 where the line marker 211, 212, 213 or 214 selected in step 1003 is continued to be displayed. Hence the same line marker 211, 212, 213 or 214 is used as picture composition guide for subsequent images. The sequence of images captured using method 1000 forms a panorama sequence wherein, if the images are composed such that the horizon coincides with the line marker 211, 212, 213 or 214, then the horizon should line up when the images are joined horizontally.

Figure 11:
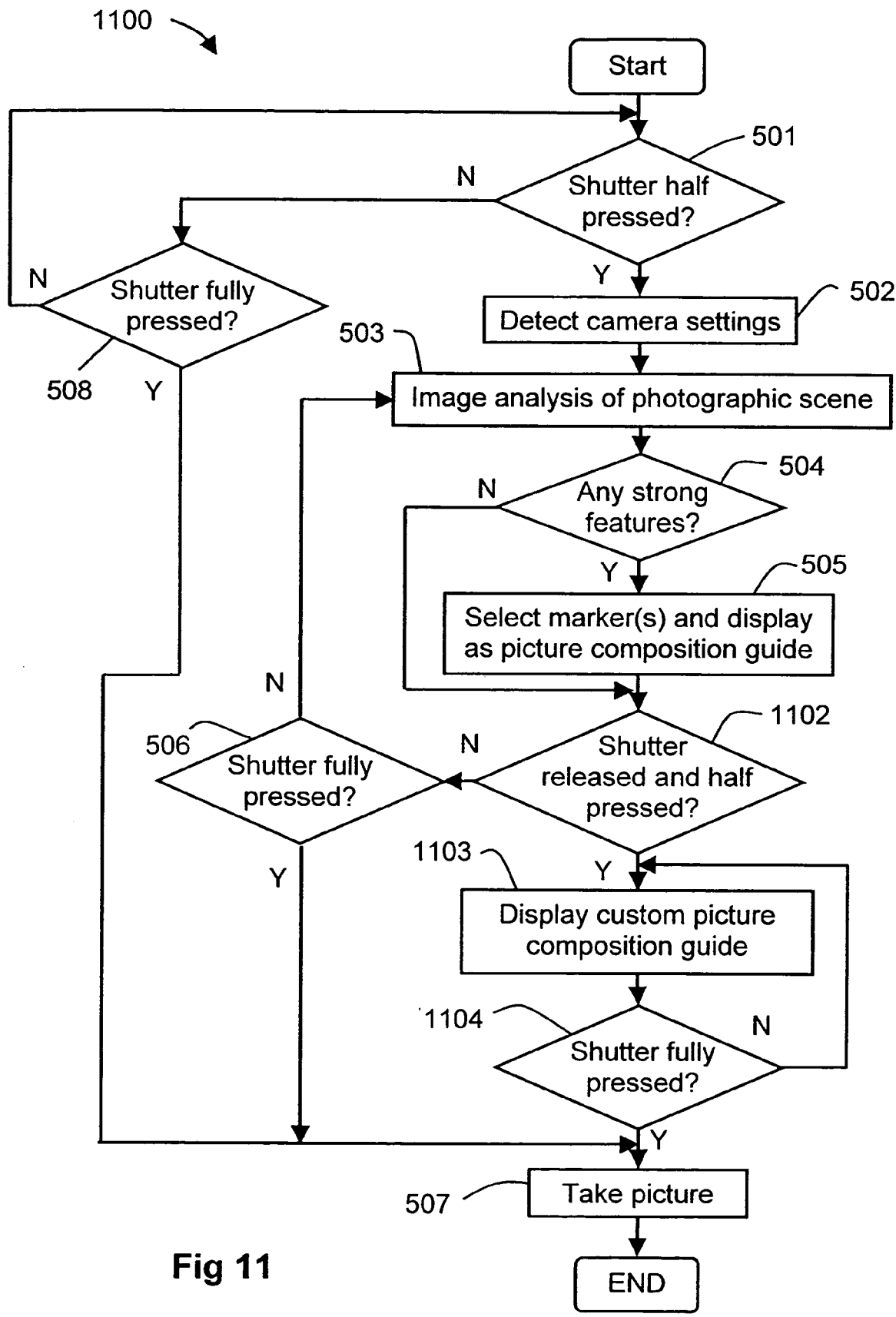
FIG. 11 shows a schematic flow diagram of a method 1100 of invoking a picture composition guide with functionality that allows a user to customise the picture composition guide.

FIG. 11 shows a schematic flow diagram of another method 1100 of invoking a picture composition guide in the viewing field of the viewfinder 404 and on the display device 407 when taking a picture with the camera 450, but with functionality that allows the user to customise the picture composition guide. Many of the steps of method 1100 are identical to the steps in method 500 (FIG. 3), and such steps have been given corresponding reference numerals.

Method 1100 starts in step 501, and performs steps 501 to 505 in the manner described with reference to FIG. 3. After the processor 406 has analysed the photographic scene, has selected one or more markers from the available markers, and has displayed those markers in the viewing field of the viewfinder 404 and on the display device 407, the method 1100 then continues to step 1102 where the processor 406 determines whether the shutter release button has been released and repressed half way down by the camera user. If it is determined that the shutter release button has not been released and repressed half way down, that is the shutter release button is still pressed half way down, then method 1100 continues to step 506 from where the camera 450 is either controlled to capture an image or processing is returned to step 503.

If it is determined in step 1102 that the shutter release button has been released and repressed half way down, then method 1100 continues to step 1103 where the marker selected and displayed in step 505 is no longer displayed, but instead a custom picture composition guide marker is displayed. For example if line marker 214 is chosen for display in step 505, then according to method 1100, in step 1103 a line marker corresponding to the actual position of the strong feature will be displayed instead of line marker 214.

Step 1103 is followed by step 1104 where the processor 406 determines whether the shutter release button is fully pressed. In the case where the shutter release button is fully pressed the camera 450 is controlled to capture an image in step 507. Alternatively, control is returned to step 1103 where the user is allowed to further customise the picture composition guide marker.

Through customising the placement of composition markers the user can determine the location of the markers different from the predetermined marker locations shown in FIG. 5. For example there may be instances where a user wishes to use a composition marker as guidance to compose a scene whereby the marker corresponds to the location of a strong feature in the scene and the strong feature is not on a thirds location. The custom placement of composition markers is particularly useful when trying to compose shots for a panorama stitch mode.

The foregoing describes only some embodiments of the present invention, and modifications and/or changes can be made thereto without departing from the scope and spirit of the invention, the embodiments being illustrative and not restrictive.

For example, instead of using a rectangular bounding box 220, a bounding oval centred in the viewing field may be used. The size of this oval may be set to vary according to the focal distance of the lens system of the camera 450.

In another modification a limit may be imposed on the number of markers that are displayed when many strong features are detected. For example in the case of "landscape mode" where the step 503 (FIG. 3) analyses the photographic scene to detect many horizontal and diagonal features, instead of displaying all the markers corresponding to each features a best horizontal and a best diagonal marker are displayed instead in step 505. The sub set of composition markers is preferably the best marker corresponding to a group of similar features. For instance if step 503 determines that a scene contains many horizontal and diagonal strong features in the scene and instead of displaying markers 213, 214 231 and 232, which will clutter and confuse the user, a best set of markers is chosen for display. If there are more horizontal features detected than diagonal features in step 503, then the horizontal features may be classified as a "stronger" feature than diagonal features and thus 213 or 214 is displayed.

In yet another modification step 505 is modified to take into account the case where a strong feature, such as the horizon, hovers between the boundary for two horizontal line markers caused for example by camera shake. In this modification a delay is built into step 505 to stabilise the composition guidance display so that it does not flicker between the two marker lines. Instead one line marker is displayed until the user intentionally placed the horizon in another part of the visual field frame for a period in time, for example one second.

In the context of this specification, the word "comprising" means "including principally but not necessarily solely" or "having" or "including" and not "consisting only of". Variations of the word comprising, such as "comprise" and "comprises" have corresponding meanings.

We claim:

1. A method of providing a picture composition guide on a display device of a camera, said picture composition guide being useful for assisting a user to capture a sequence of panoramic photographs with said camera, said method comprising the steps of:
    detecting a panorama mode of said camera;
    detecting an orientation of said camera;
    performing image analysis on an image being displayed on said display device, said image representing a photographic scene;
    detecting the location of a horizon in said image;
    selecting a first horizontal line marker dependent upon the location of said horizon when the orientation of said camera is a first orientation, and a second horizontal line marker dependent upon the location of said horizon when the orientation of said camera is a second orientation;
    superimposing the first or second horizontal line marker over said Image on said display device; and
    retaining the first or second horizontal line marker after the capture of a first image, the retained first or second horizontal line marker being useful for assisting said user to capture subsequent images in said sequence of panoramic photographs.

2. The method as claimed in claim 1 wherein the step of performing image analysis on said image comprises the steps of:
    obtaining said image being displayed on said display device;
    converting the pixel values of said image into intensity values;
    applying a bluffing operation to said intensity values, followed by an edge detection operation and a thresholding operation to create a resulting image; and
    detecting the location of a strong horizon feature in the photographic scene from summing the intensity values in rows of said resulting image and locating the row with a peak value.

3. The method as claimed in claim 2 wherein the detecting step comprises the step of:
    classifying said strong horizontal features.

4. A camera providing a picture composition guide on a display device of said camera, said picture composition guide being useful for assisting a user to capture a sequence of panoramic photographs with said camera, said camera comprising:
    means for detecting a "panorama mode" of said camera;
    means for detecting an orientation of said camera;
    means for performing image analysis on an image being displayed on said display device, said image representing a photographic scene;
    means for detecting the location of a horizon in said image;
    means for selecting a first horizontal line marker dependent upon the location of said horizon when the orientation of said camera is a first orientation, and a second horizontal line marker dependent upon the location of said horizon when the orientation of said camera is a second orientation;
    means for superimposing the first or second horizontal line marker over said image on said display device; and
    means for retaining the first or second horizontal line marker after the capture of a first image, the first or second horizontal line marker being useful for assisting said user to capture subsequent images in said sequence of panoramic photographs.

* * * * *